United States Patent [19]

Cianciosi et al.

[11] Patent Number: 5,581,292

[45] Date of Patent: Dec. 3, 1996

[54] METHOD AND APPARATUS FOR ENHANCING CHARGED AREA DEVELOPED REGIONS IN A TRI-LEVEL PRINTING SYSTEM

[75] Inventors: Michael S. Cianciosi; Robert P. Loce, both of Rochester; Martin E. Banton, Fairport; Ronald E. Jodoin, Pittsford, all of N.Y.

[73] Assignee: Xerox Corporation, Stamford, Conn.

[21] Appl. No.: 118,859

[22] Filed: Sep. 10, 1993

[51] Int. Cl.$^6$ .................................................. B41J 2/385
[52] U.S. Cl. ........................ 347/131; 347/112; 347/252; 358/459
[58] Field of Search ................... 347/112, 115, 347/225, 232, 239, 255, 252–254, 131; 355/326, 327, 328; 358/298, 459

[56] References Cited

U.S. PATENT DOCUMENTS

| | | | |
|---|---|---|---|
| 4,347,523 | 8/1982 | Ohara | 347/252 |
| 4,375,065 | 2/1983 | Ohara | 347/252 |
| 4,390,882 | 6/1983 | Ohara et al. | 347/253 |
| 4,437,122 | 3/1984 | Walsh et al. | 358/447 |
| 4,544,264 | 10/1985 | Bassetti et al. | 347/131 |
| 4,544,922 | 10/1985 | Watanabe et al. | 345/137 |
| 4,625,222 | 11/1986 | Bassetti et al. | 347/131 |
| 4,626,923 | 12/1986 | Yoshida | 358/459 |
| 4,661,859 | 4/1987 | Mailbux et al. | 358/456 |
| 4,847,641 | 7/1989 | Tung | 347/131 |
| 4,905,023 | 2/1990 | Suzuki | 347/252 |
| 4,926,268 | 5/1990 | Kawamura et al. | 358/458 |
| 4,933,689 | 6/1990 | Yoknis | 347/131 |
| 4,965,672 | 10/1990 | Duke et al. | 347/235 |
| 5,005,139 | 4/1991 | Tung | 395/101 |
| 5,041,848 | 8/1991 | Gilbert et al. | 347/251 |
| 5,134,495 | 7/1992 | Frazier et al. | 347/254 |
| 5,138,339 | 8/1992 | Curry et al. | 347/240 |
| 5,144,337 | 9/1992 | Imamura et al. | 347/252 |
| 5,144,338 | 9/1992 | Sakano | 347/252 |
| 5,184,226 | 2/1993 | Cianciosi | 358/296 |
| 5,193,008 | 3/1993 | Frazier et al. | 347/254 |
| 5,193,011 | 3/1993 | Dir et al. | 358/298 |
| 5,223,857 | 6/1993 | Loce et al. | 347/255 |
| 5,260,799 | 11/1993 | Loce et al. | 355/326 R |

FOREIGN PATENT DOCUMENTS 0361538   2/1986   European Pat. Off.   ....... H04N 1/411

OTHER PUBLICATIONS

L. Steidel, "Technology Overview: Resolution Enhancement Technologies for Laser Printers", *LaserMaster Corp.*
Richard Johnson, et al., "Scophony Spatial Light Modulator", *Optical Engineering*, vol. 24, No. 1, Jan./Feb. 1985.

*Primary Examiner*—John E. Barlow, Jr.
*Attorney, Agent, or Firm*—Duane C. Basch

[57] ABSTRACT

The present invention is a an apparatus for enhancing the output along edges of charged area developed regions in a tri-level imaging system employing a pulse width and position modulated signal ROS for exposure. The invention enables the identification and selective alteration of video data used to drive the ROS so as to extend the developed regions by a selected amount and eliminate digitization artifacts present in the image to be printed. The extension of the charged area developed regions is accomplished by reducing or trimming the width of the exposure pulses in adjacent areas to enable development within a portion of those regions.

18 Claims, 7 Drawing Sheets

METHOD AND APPARATUS FOR ENHANCING CHARGED AREA DEVELOPED REGIONS IN A TRI-LEVEL PRINTING SYSTEM

This invention relates generally to a apparatus for enhancing regions of an image output by a digital printing system, and more particularly to an enhancement system which alters the digital image signals used to drive a pulse width modulated printing exposure device in a tri-level xerographic printer.

CROSS-REFERENCE

The following related applications are hereby incorporated by reference for their teachings:

"Pulsed Imaging, Pulse Width Modulated Scanner for a Tri-Level Highlight Color Imaging System" by Swanberg et al., Ser. No. 07/756,643, filed Sep. 9, 1991.

"Apparatus for Enhancing Pixel Addressability in a Pulse Width and Position Modulated System" by Cianciosi et al., Serial No. 08/118,858, filed concurrently herewith.

BACKGROUND AND SUMMARY OF THE INVENTION

The present invention may be used in a tri-level printing system that utilizes a pulse width modulated raster output scanner (ROS) to produce a tri-level latent image such as the Xerox 4850 Highlight Color Laser Printing System. The tri-level latent image produced in such a system is developed and transferred to an output sheet or similar print medium. In tri-level or highlight color imaging, unlike conventional xerography, upon exposure, three charge levels are produced on the charge-retentive surface. The highly charged (i.e. unexposed) areas are developed with toner, and the area most fully discharged is also developed, but with a toner of a different color, referred to as the highlight color. The charge retentive surface is exposed at three levels; zero exposure, intermediate exposure, and full exposure, which correspond to three charge levels. The three resulting levels can be developed to print, for example, black, white, and a single color.

As described in U.S. patent application Ser. No. 07/756,643, the relevant portions of which are hereby incorporated by reference, charged portions of a photoreceptor surface are advanced through an exposure station. Briefly, at the exposure station the photoreceptor surface is exposed by a tri-level ROS unit which causes the surface to be discharged in accordance with the output from an image source. This scan produces three separate discharge regions on the photoreceptor, each region exposed at one of three possible levels: (1) zero exposure which results in a voltage equal to the dark-decay potential and will be developed using charged area development (CAD); (2) full exposure, which results in a low voltage level and is developed using discharged area development (DAD); and (3) intermediate exposure, which yields an intermediate voltage level that does not result in development by CAD or DAD, yielding a background region on the print. Subsequent to development, the developed image is transferred and fused to the print medium using techniques commonly known for tri-level xerographic printing systems.

Heretofore, various methods and apparatus have been used to control and enhance the output of ROS based printing systems. Moreover, several scanning techniques are known to obtain tri-level exposure imaging. To obtain higher spatial resolution, a pulsed imaging scanner can be utilized. This pulsed imaging scanner is also referred to as a Scophony scanner in an article in Optical Engineering, Vol. 24, No. 1, Jan./Feb. 1985, *Scophony Spatial Light Modulator*, by Richard Johnson et al., whose contents are hereby incorporated by reference. The following disclosures may be relevant:

U.S. Pat. No. 4,347,523, also to Ohara, discloses an apparatus of general interest which uses an input signal to address pulse numbers with corresponding pulse width selection numbers.

U.S. Pat. No. 4,375,065 to Ohara describes an apparatus of general interest that uses pulse number and pulse position modulation to control a laser beam.

U.S. Pat. No. 4,390,882 to Ohara et al. discloses for an image processing apparatus a method of adjusting the image density by controlling the on time of the laser. Control of the laser on time is performed by a multivibrator having a variable RC time constant.

U.S. Pat. No. 4,437,122 to Walsh et al. teaches an improved method of converting low resolution images into images of higher resolution for printing so as to simultaneously increase density and smooth character edges. In a CRT display or hardcopy output apparatus, the invention is accomplished by converting an original pixel into a higher resolution 3×3 enhanced representation. The status of each of the nine elements in the enhanced representation is determined as a result of an examination of the neighboring pixels of the original pixel.

U.S. Pat. No. 4,544,264 and U.S. Pat. No. 4,625,222, both issued to Bassetti et al. describe enhancement circuits suitable for use in a laser based electrophotographic printing machine. The enhancements are directed at modifying the digital drive signals used to produce the image, including smoothing digitized edges and broadening fine lines in both the horizontal and vertical directions. Leading and trailing edge signals, in both directions are provided to potentially print each black pixel or line as a series of three pixels, a gray leading pixel, overlapped by a central black pixel, which is in turn overlapped by a gray trailing pixel. A similar process is applied for scanlines as well. The series of signals are recombined to effectively control the voltage and current levels of a laser driver.

U.S. Pat. No. 4,544,922 to Watanabe et al. teaches a smoothing circuit for an orthogonal matrix display. The circuit adds or removes a "small dot" on the display from either the first or last third of a dot clock (DCK) period which is one-third the period in which a standard dot of the original pattern is displayed.

U.S. Pat. No. 4,626,923 to Yoshida teaches an image processing apparatus for producing a halftone image in which the on time of the laser is controlled by both the image input data and a pulse width modulation circuit. The image data is transferred under control of clock signal, CLK. The pulse width modulation circuit includes a clock, CLKH, having a frequency three times that of CLK, which is used together with latches and AND gates to provide synchronous sub-pixel addressing.

U.S. Pat. No. 4,661,859 to Mailloux et al. describes an image processing circuit for producing a greyscale image in which the on time of the laser is controlled by both the video input data and the pulse width modulation circuit. The pulse width modulation circuit includes a clock having a frequency greater than the video data rate, which allows synchronous sub-pixel addressing.

U.S. Pat. No. 4,847,641 and U.S. Pat. No. 5,005,139 to Tung disclose print enhancement circuitry for a laser beam printer. The bit map of a region of the image to be output is compared to a number of patterns or templates. When a match is detected, a section of the bitmap which was matched is replaced with a unique bitmap section designed to compensate for errors. The replacement bitmap section may include predetermined shifting of some dot positions to compensate for the error in the original bitmap section.

U.S. Pat. No. 4,905,023 to Suzuki, describes an image forming apparatus using a plurality of conversion tables addressed by an input video image signal to generate pulses.

U.S. Pat. No. 4,926,268 to Kawamura et al. discloses an image processing apparatus which employs analog circuitry to produce a pulse-width modulated (PWM) output from a multi-level digital signal. As described, each analog signal is generated in synchronism with the pixel clocks.

U.S. Pat. No. 4,933,689 to Yoknis describes a method for enhancing a displayed image in a laser exposed dot matrix format to produce softened edge contours. Using three pulses, a central pulse plus leading and trailing enhancement pulses which are separated therefrom. The purpose of the leading and trailing pulses is to create a blurred or grayed region at the leading and trailing edges of each associated character.

U.S. Pat. No. 4,965,672 to Duke et al. discloses an apparatus for varying the width and position of pulses used to control a laser beam.

U.S. Pat. No. 5,041,848 to Gilbert et al. teaches a non-gray scale anti-aliasing method for smoothing the horizontal components of the edges of an image to be printed by a laser printer having unequal pixel resolutions in the horizontal and vertical dimensions. Working from an ideal outline of the image, the method smooths the edges of the digital outline by selectively modifying the on and off states of pixels on either side of the vertical transition point along the horizontal components at the edges of transition to produce a modified pixel representation.

U.S. Pat. No. 5,134,495 to Frazier et al. discloses a laser based imaging system which employs a resolution transformation method. The method uses the selective activation in overlapping areas between rasters (scan lines). In one embodiment, a single interleaved pixel, between two scan lines, is formed by the sum of up to six laser pulses at pixel points on adjacent scanlines. In some cases the laser pulses are of insufficient intensity to produce a dot or mark at the point on the scanline where the center of the pulse is received.

U.S. Pat. No. 5,144,337 to Imamura et al. teaches an image forming apparatus suitable for changing the size of an output dot in a main and subscanning direction. Dot size and shape are controlled by pulse width modulation and power modulation applied to a laser diode.

U.S. Pat. No. 5,144,338 to Sakano discloses an image recorder which employs a pulse width modulated laser beam to control the recording position on a photoconductive drum. The position (left aligned, centered, or right aligned) and duration (12 ns, 20 ns, 32 ns, or 56 ns) of the pulse within a pixel interval is determined based upon the tone level of the pixel of interest and its relation to the tone levels of both preceding and following pixels.

U.S. Pat. No. 5,184,226 to Cianciosi describes a digital system for generating pulses from a series of data words, the relevant portions of which are hereby incorporated by reference. The system employs multiple RAM look-up tables for translating the data words into a series of corresponding pulses utilizing two channels to achieve the desired throughput.

U.S. Pat. No. 5,193,008 to Frazier et al. further describes the resolution enhancement apparatus as one which includes the ability to rasterize the image to be printed at twice the resolution of the printer. The printer then outputs the higher resolution image using an interleaving technique which generates developable dots between scan lines by energizing corresponding dots on adjacent scanlines at a level which will not be developed, but where the overlapping portion of the two corresponding dots will be developable.

U.S. Pat. No. 5,193,011 to Dir et al. discloses a system for printing gray levels without the need of a halftone cell. The system determines the pulse width for each pixel as a function of the gray level of the pixel, based upon an iterative comparison to an incrementing grey level clock. In one embodiment, a page-wide liquid crystal shutter is used to regulate the exposure of a photoconductive drum. The shutter may be toggled on and off multiple times for each pixel during the recording of a single row of the image.

U.S. Pat. No. 5,223,857 to Loce et al. describes a pulsed imaging ROS which utilizes pulse width modulation in conjunction with spatial filtering to form three exposure levels on a photoresponsive surface, each level being associated with a specific development color.

EP-A-361,538 by Goertzel et al. discloses a system for producing halftone images with sharpness or edge enhancement. The edge enhancement is achieved by employing a high resolution output device to print out halftone cells resulting in lower resolution "grey" blocks in stead of just black or white output.

L. Steidel in "Technology Overview: Resolution Enhancement Technologies for Laser Printers", *LaserMaster Corp.*, discusses three currently available implementations for vertical resolution enhancement, Resolution Enhancement Technology, Paired Scan Line Scheme, and TurboRes. In all cases, the horizontal resolution of the laser scanner is increased by increasing the clock speed. On the other hand, the vertical resolution is enhanced by combining the weaker laser laser energy from a brief laser flash, which leaves only residual or fringe energy on the image drum at the periphery of a pixel of an adjacent pixel on a second scan line.

A preferred technique, capable of higher spatial resolution, is to use similar optical elements as the flying spot scanner (rotating polygon, laser light source, pre-polygon and post-polygon optics), but with an acoustooptic (A/O) modulator which illuminates many pixels at a given time, resulting in a scanner with a coherent imaging response. With this type of scan system, the exposure level, or levels at the image surface, can be controlled by controlling the drive level of the A/O modulator dependent on the video data. In a tri-level system, two drive levels are used, one for the white exposure and a second higher drive level for the DAD, or highlight color, exposure.

Instead of obtaining an intermediate exposure level by controlling the acoustic amplitude, an intermediate exposure may be produced using pulse width modulation in a pulsed imaging system in conjunction with spatial filtering. Using an intuitive, or conventional approach to pulsed width modulation, in which the pulses are centered on the pixels, not only leads to color text and graphics in output prints that may have a "bloated" or bolded appearance, but also reproduces what are commonly referred to as "jaggies" when digitized images are printed. Most often, the jaggies are visible along the edges of angled or curved lines, and along characters produced with rasterized fonts. According to one aspect of the present invention, and in a preferred embodiment, the jaggies problem is eliminated for CAD developed regions (i.e., angled or curved black edges) by trimming the nearest edge of white video pulses, used to produce neighboring pixels, to produce a "grey" output.

In accordance with the present invention, there is provided a method for enhancing charged area developed regions on a photoresponsive member in a pulsed imaging, pulse width modulated printing system used for creating tri-level images on a photoresponsive member. The method comprises the steps of: converting a series of video data into a series of composite analog video pulses corresponding to a plurality of pixel periods, each pixel period having a composite video pulse representing a charged area, discharged area, and intermediate discharged area to be formed on the surface of said photoreceptor member, said composite video pulses being applied to an acoustooptic modulator to modulate a laser beam used to expose regions of the photoresponsive member; identifying, a subset of the video data to be altered so as to improve the appearance of the charged area developed regions of the output image; and altering selected video data within the subset by modifying a video pulse corresponding to the selected video data.

In accordance with another aspect of the present invention, there is provided a charged area development enhancement apparatus for a pulsed imaging, pulse width modulated printing system which creates tri-level images on a photoresponsive member, including: an acoustooptic modulator to modulate a laser beam used to expose regions of the photoresponsive member; means for converting a stream of video data, representing a plurality of pixels, into composite analog video pulses having uniform pixel periods, each pixel period defining a composite video pulse representing a charged area, discharged area, and intermediate discharged area to be formed on the surface of said photoreceptor member, said composite video pulses being applied to the acoustooptic modulator; means, responsive to the stream of video data, for identifying a subset of video data therein to be altered so as to improve the appearance of the charged area developed regions of the output image; and means for altering the video data representing a selected pixel within the subset by modifying the video pulse corresponding to the selected pixel.

Figure 1:
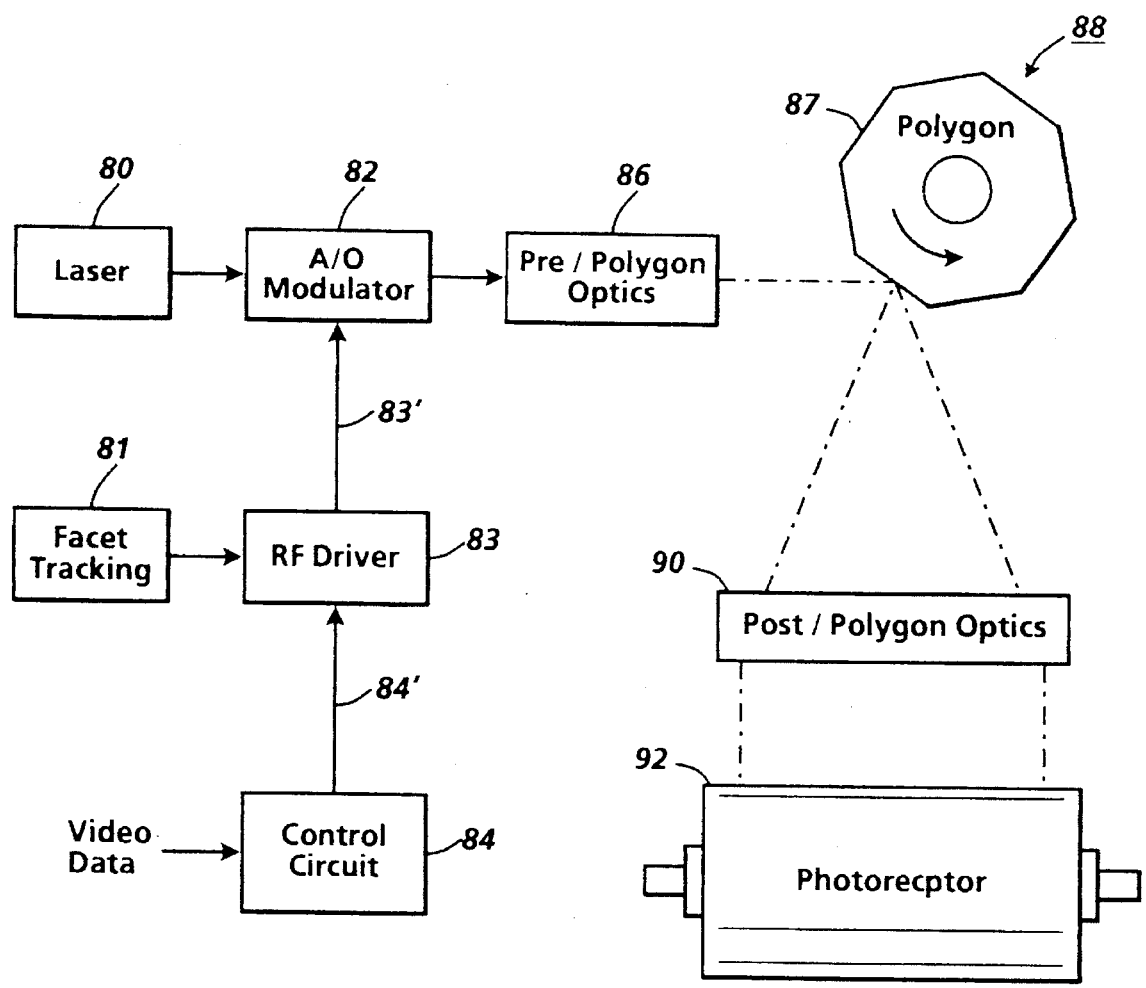
FIG. 1 is a schematic view of a pulsed imaging pulse width modulation, facet tracked raster output scanning (ROS) system.

The present invention will be described in connection with a preferred embodiment, however, it will be understood that there is no intent to limit the invention to the embodiments described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In the description to follow, the reference to color pixels or color development is generally understood to be directed toward the production of a highlight color mark on an output medium. There are two common types of ROSs, flying spot and pulsed imaging ROSs. As used herein, the terms "data" or "data word" are intended to describe one or more digital signals used to represent an image, such as video signals. Moreover, the term "video data" is used to denote electrical signals which carry image information for one or more picture elements, or pixels.

FIG. 1 shows a pulsed imaging, pulse width modulation, facet tracked ROS system, according to a first aspect of the present invention. A focused beam of light from a laser 80 is applied to acoustooptic (A/O) modulator 82. A control circuit 84 converts an image bitmap video data stream into an analog video data stream consisting of a plurality of pixel periods, each period having a signal content representing charged area (black), discharged area (color) and intermediate discharged (white) to be formed on the surface of photoreceptor 92. Circuit 84 controls the drive level of modulator 82. The light output profile emerging from modulator 82 is defined by the overlap of the acoustic pulses and the illuminating light beam from laser 80 and enables individual acoustic pulses to be imaged onto photoreceptor 92. In the fast scan direction, the anamorphic prepolygon optics 86 performs a Fourier transformation of the optical pulses exiting the A/O modulator, and projects the Fourier profile onto facets 87 of rotating polygon 88. The polygon is placed at the back focal plane of the post polygon optics 90 and the front focal plane of the prepolygon optics 86. The frequency of the rf used to excite the modulator is swept in synchronism with the scanning across the photoreceptor by means of facet tracking circuit 81 and rf driver circuit 83 so that the Fourier profile remains centered on the facets 87 of the rotating polygon 90. The size of the zero-order spot at the facet is dependent on, and is inversely proportional to, the size of the beam in the modulator, with the diffracted orders also exhibiting this same proportionality.

As polygon 88 rotates, the optical image of the acoustooptic video pattern is swept across the surface of photoreceptor 92, after passing through post polygon optics 90. Acoustic image motion at the photoreceptor surface which, if uncorrected, would blur the optical image, is cancelled by balancing the acoustic and scan velocities with the prepolygon and postpolygon optics magnification, resulting in the acoustic image remaining stationary on the photoreceptor. The imaged line is exposed at three exposure levels, zero, intermediate and full. The intermediate (white) exposure level is obtained from the pulse width narrowed video signals which become spatially narrow optical pulses exiting the modulator 82 and are filtered by facets 87 to result in a low uniform exposure at the photoreceptor 92.

Typically, the video data used to drive the ROS is clocked so that the period within which each pixel is exposed, referred to hereafter as a pixel clock period, is the same. In addition, the video data used to generate the video signal pulses which drive the modulator are also synchronized with ROS 18 and the movement of the image plane 32 in the slow scan direction, thereby allowing a particular bit of video data to address an appropriate portion of image plane 32. The synchronization of the video data, the video pulses produced therefrom, the ROS, and the image plane is achieved through the use of a system clock that is equivalent to the rate at which pixels must be exposed on the image plane. While faster clocks may allow greater resolution within the video pulse stream, a higher frequency also results in increased costs for faster hardware within the video processing path. Accordingly, the present invention seeks to provide enhanced images without the need for increased clock frequency.

Figure 2A:
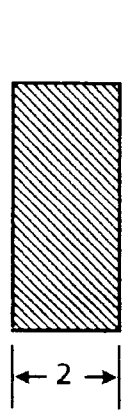
FIGS. 2A–2C illustrate the responses of a xerographic printing system employing charged area development.
Figure 2B:
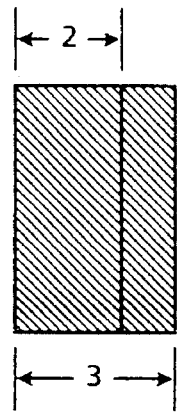
Figure 2C:
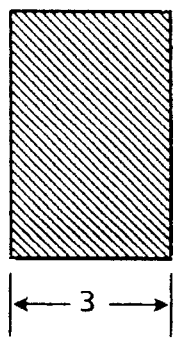

FIGS. 2A–2C and 3A–3D, as will be hereinafter described, are intended to represent the response of a xerographic system to "gray" or intermediate exposures. While it is acknowledged that xerography does not produce large areas of intermediate exposures well, it does respond in a stable and characterizable manner to gray pixels adjacent to fully developed, or binary pixels. For example, FIGS. 2A–2C illustrate how the xerographic process responds to gray exposures when those exposures are adjacent to pixels that are fully developed (i.e., black in a CAD system). More specifically, FIG. 2A illustrates a 2-pixel wide vertical line, and FIG. 2C illustrates a 3-pixel wide vertical line, both being printed in black by zero exposure with a ROS. On the other hand, FIG. 2B illustrates the intent of the present invention, that is to utilize a gray (intermediate exposure) pixel to slightly extend the 2-pixel wide line so as to achieve an intermediate line width. The effect of the gray exposure, illustrated along the right edge in FIG. 2B, is to stretch the edge of the fully developed area partially into the gray pixel. As the gray exposure is varied from white to black, the edge is shifted further into the gray pixel area. Thus, gray exposures adjacent to fully developed unexposed regions provide a means to produce a series of line widths intermediate to the single pixel addressability of the imager.

Figure 3A:
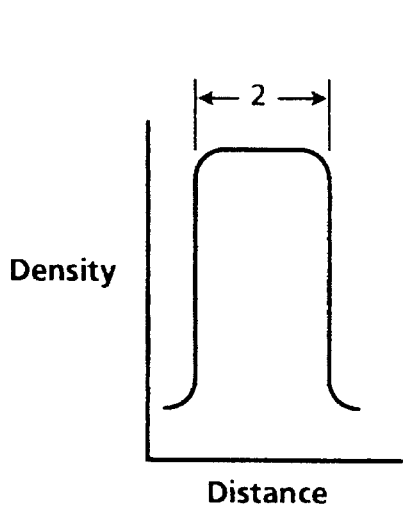
FIGS. 3A–3D are graphical representations of line density versus distance for a xerographic printing system employing charged area development.
Figure 3B:
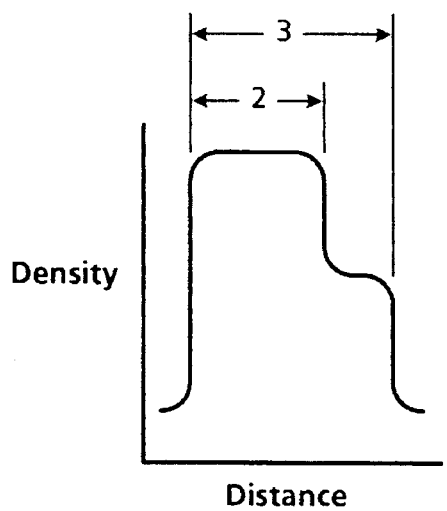
Figure 3C:
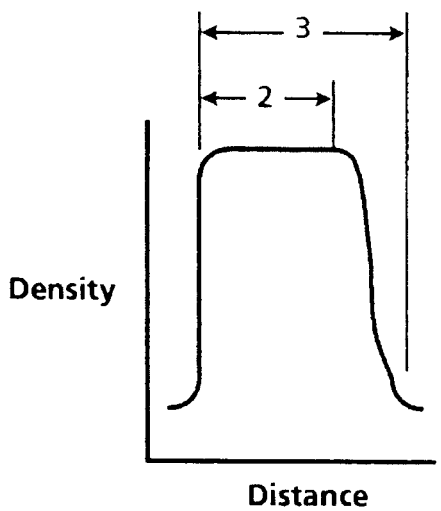
Figure 3D:
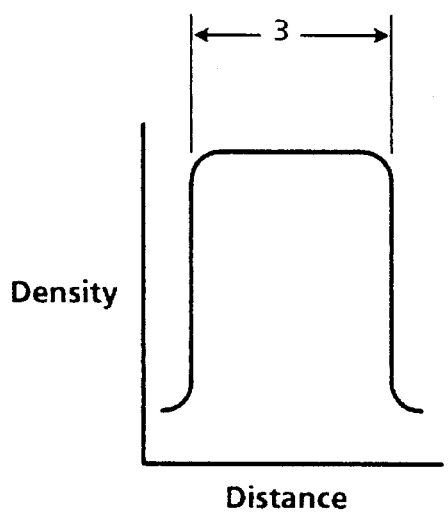

Correspondingly, the line density representations of FIGS. 3A–3D illustrate the phenomena relied upon with respect to FIG. 2B. FIGS. 3A and 3D illustrate the toner density curves for the 2- and 3-pixel wide lines illustrated in FIGS. 2A and 2C, respectively. FIG. 3B illustrates the charge density that would be created on the photoreceptor by the ROS to produce a 2-pixel wide line with an adjoining gray pixel along the right side thereof. On the other hand, FIG. 3C illustrates the blurring effect or response of the xerographic system to the charge density profile of FIG. 3B, where the intermediate exposure of the gray pixel region along the right side effectively extends the edge of the 2-pixel wide line to the right, shown as the developed toner density representation of FIG. 3C.

Figure 4C:
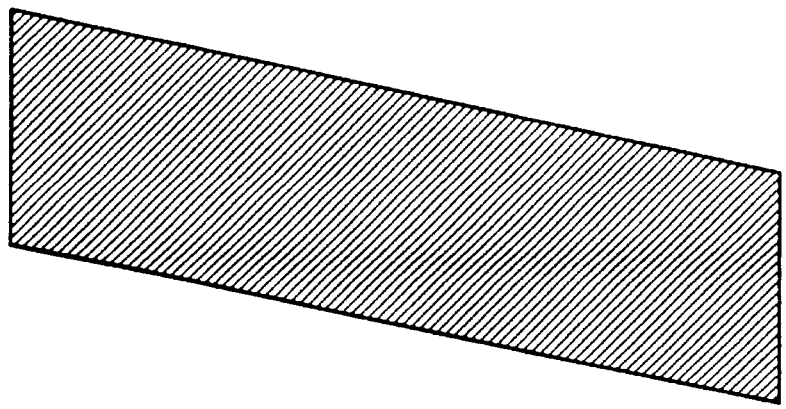
FIGS. 4A–4C illustrates an application of the present invention to produce gray exposures which are used to smoothly print jagged edges present in digitized images.
Figure 4B:
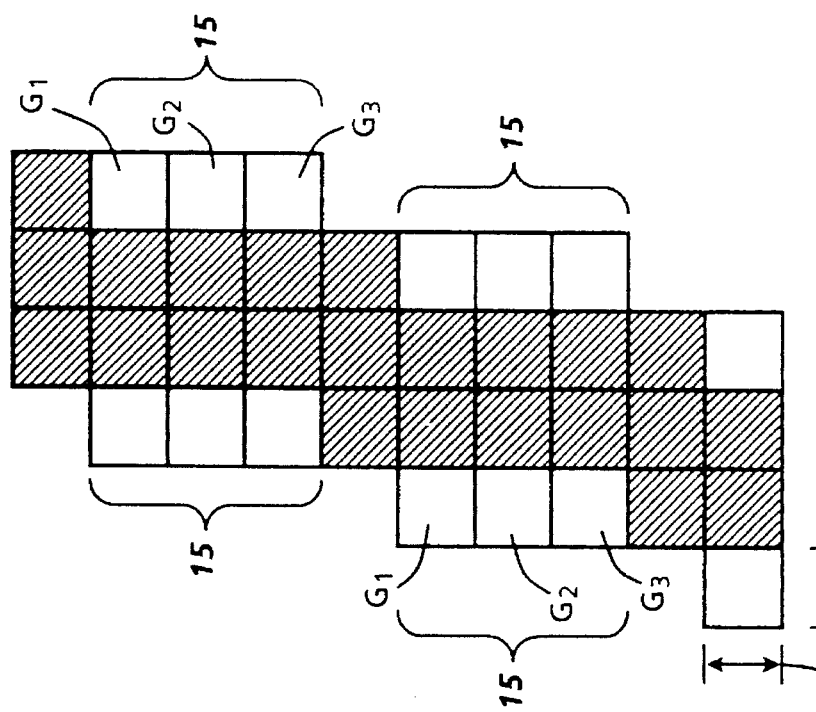
Figure 4A:
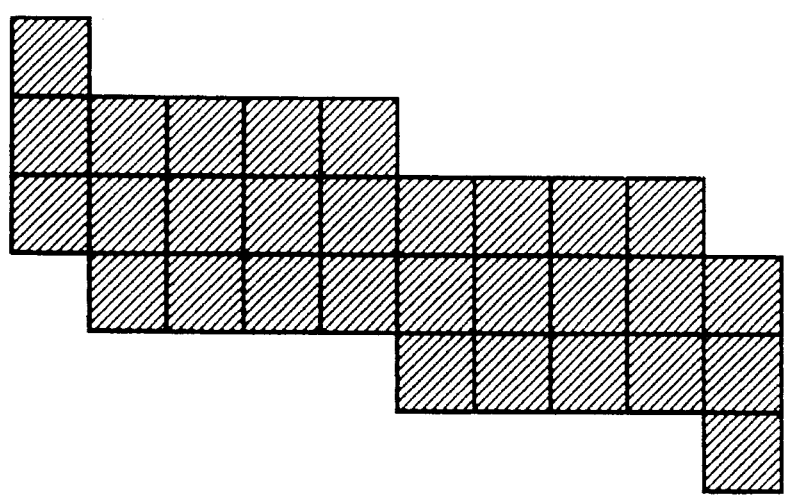

Employing the gray imaging response of the xerographic system, FIGS. 4A–4C illustrate how gray exposures can be used to smooth the jagged edges present in typical 300 spi printing systems. As will be hereinafter described, gray exposures (G) are used to move the line edge by ¼ ($G_1$), ½ ($G_2$), and ¾ ($G_3$) of a pixel. For example, given the digitized image of a sloped line, as illustrated in an expanded view by FIG. 4A, the present invention would seek to enhance the output of the line so as to smooth the jagged edges thereon. To accomplish the smoothing of the edges, the present invention would monitor the image data which is to be printed to identify the presence of "jaggies" within the stream of image signals. Subsequently, gray pixels of varying levels would be added to the jagged regions indicated by reference numeral 15 in FIG. 4B to slightly extend the edge of the sloped line in the regions. Thus, where maximum extension of the edge is needed, a gray level $G_3$ will be exposed for that pixel position, and where only slight extension of the edge is needed, a gray level $G_1$ will be exposed. Then, the xerographic process will merge the intermediate level gray pixels to produce a sloped line edge like that shown in FIG. 4C.

Figure 5:
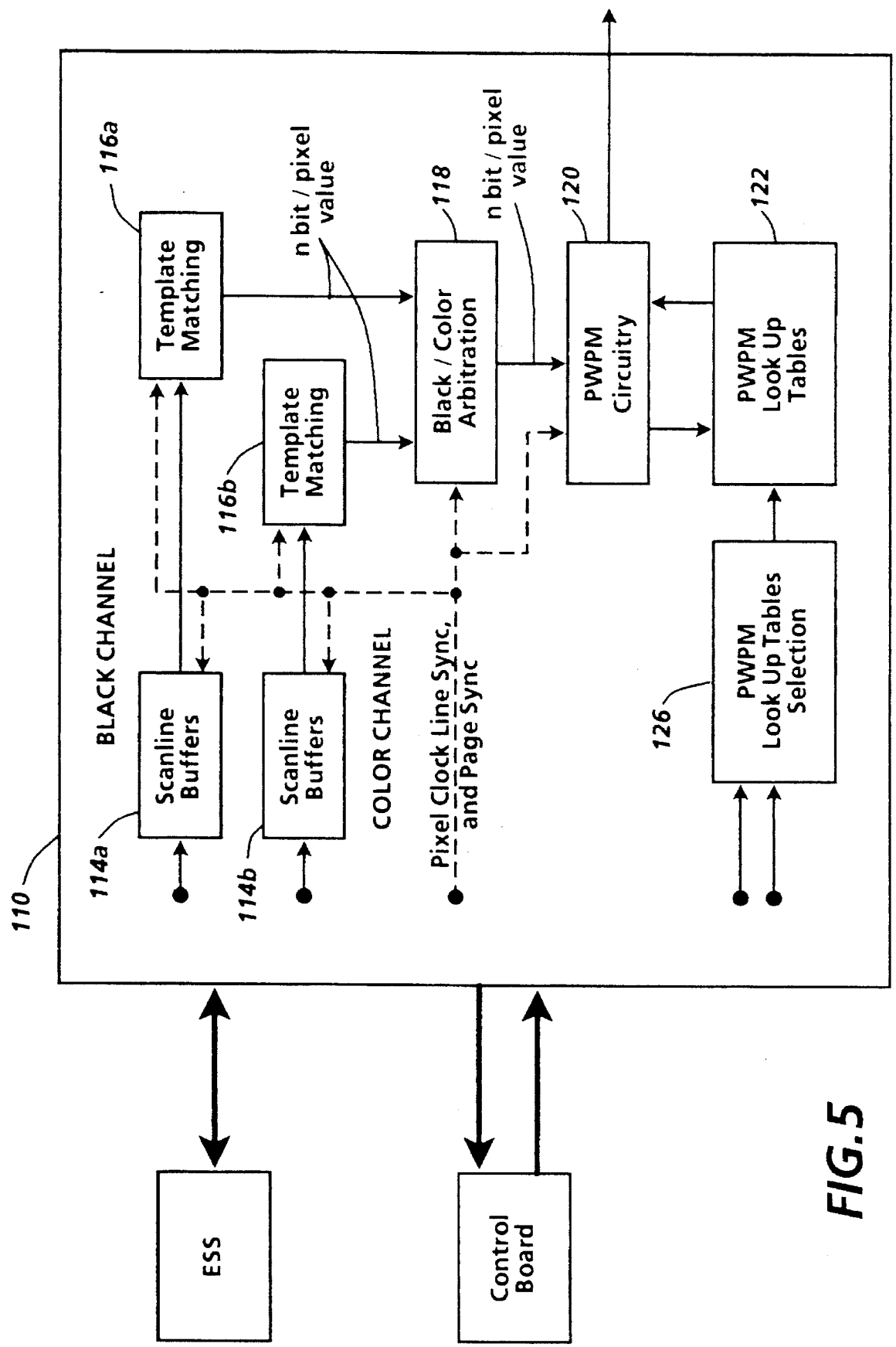
FIG. 5 is a block diagram illustrating the components of an image enhancement embodiment incorporating the present invention.

Turning now to FIG. 5, the system used to accomplish the previously described steps will be described. In the present embodiment, a pulse width, position, and amplitude modulator (pulse modulator) is utilized to form the video pulses in response to video data representing the image to be printed. The width and position of a pulse within a pixel clock period Δ may be varied with separate, independently variable delays for the leading edge and trailing edge of the pulse, as described in U.S. patent application Ser. No. 08/118,858, the relevant portions of which are hereby incorporated by reference. In a normal operating mode, a pulse would be generated in response to information in a corresponding data word, as disclosed in U.S. Pat. No. 5,184,226 to Cianciosi, issued Feb. 2, 1993, the relevant portions of which are hereby incorporated by reference.

The architecture of an image enhancement board 110 which carries out the previously described aspects of present invention will now be described with reference to FIG. 5. The primary functions of image enhancement board 110 are to: 1) provide scanline buffers for image data, 2) carry out template matching on the buffered data, 3) provide arbitration circuitry, 4) enable PWPM table look-up selection circuits, and 5) provide PWPM electronics to generate the required video pulses to drive the acoustooptic modulator 82 of FIG. 1. Note that there are two channels present on image enhancement board 110, one to handle the black image information and the other to handle the color image information. Each channel is processed independently, knowing that the input video would, by design, never have the redundant state where a pixel was listed as black and highlight color.

Figure 6A:
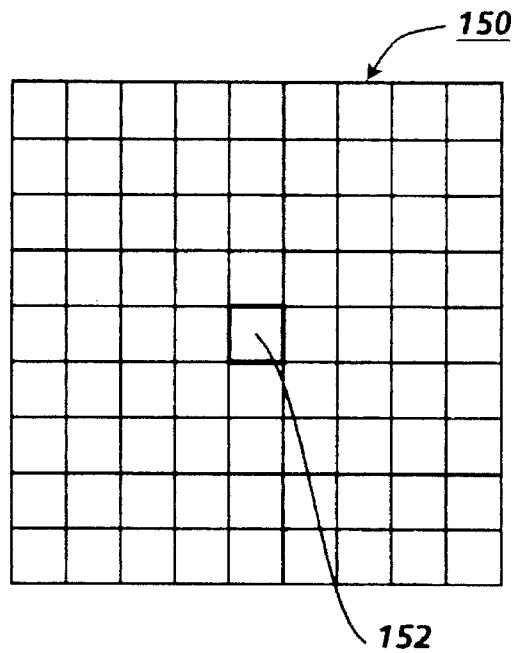
FIG. 6A is a schematic representation of an array of pixel locations employed by the present invention in a template matching operation.
Figure 6B:
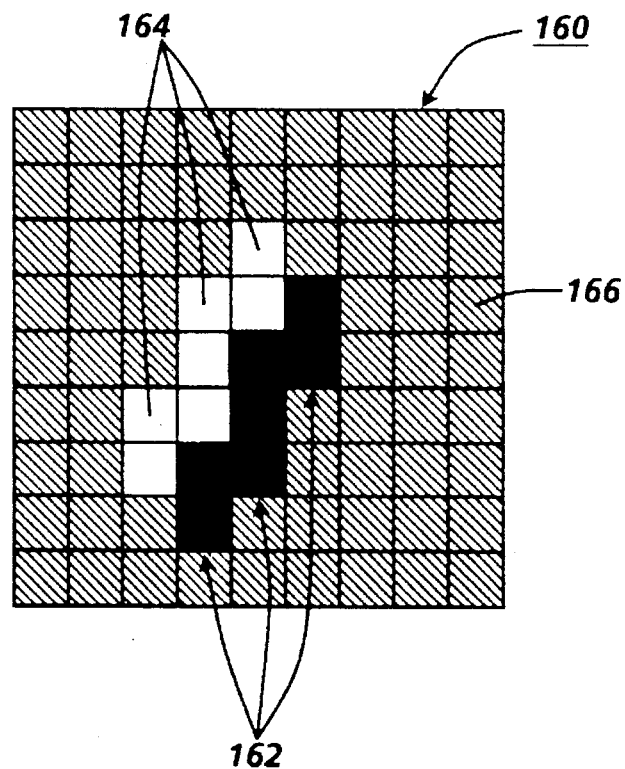
FIG. 6B is a schematic representation of an example of a template used in a preferred embodiment of the present invention.

Scanline buffers 114a, b serve the purpose of storing complete scanlines or rasters of video data, preferably nine scanlines, or possibly ten scanlines so that nine may be used while the next scanline is being loaded into the tenth buffer. From the scanline buffers, eighty-one pixels in a 9×9 square matrix are input to template matching blocks 116a and 116b. In a preferred embodiment, the functionality of template matching blocks 116a, b would be provided by an application specific integrated circuit (ASIC). Referring to FIGS. 6A and 6B, within the template matching blocks, the video data representing the 9×9 array of pixels 150 surrounding a selected central pixel 152 are compared against a predefined set of templates, for example the template of FIG. 6B, to determine if the current pixel pattern matches one of the templates in the set.

Many techniques are available for identifying the regions of a digitized image which require image enhancement to eliminate half-bitting so as to more accurately replicate curved or diagonal edges within an image. The present invention utilizes a set of predefined templates to search for areas having a requisite set of "on" and "off" pixels within at least a portion of the 9×9 region 150. More specifically, the template matching blocks compare the required "on" or black pixels 164 within array 160, illustrated in FIG. 6B as darkened pixels to the corresponding pixel positions in the image array 150. Assuming all the required "on" pixels of the template have corresponding matches, the "off" or white pixels, represented by reference numeral 164 and shown as white spaces, are then compared in a similar fashion. In FIG. 6B, the shaded pixel positions, for example position 164, represent "don't care" positions where the output level of the pixel is of no importance to the comparison. If no template match is identified, the output of the ASIC in template matching block 116 is set to 0 when the central pixel is white, and is set to 1 if the incoming pixel were black or color. This preserves the level or color of the input image in a non-match situation.

Assuming that a template is matched, a code is generated and output from template matching blocks 116a or 116b to specifically identify the way that the central pixel, pixel 152 is to be imaged. To produce the five possible output levels depicted in FIG. 4B, a 3-bit value would be output from the template matching blocks. For example, the output codes could be as follows: 000h for a white pixel; 111h for black; 001h for $G_1$; 010h for $G_2$; and 011h for $G_3$.

Each channel on the image enhancement board is processed independently. As a result, there will be cases where both the black and color channels assign a value to the same pixel. This situation is resolved within the arbitration block 118. In one embodiment, the arbitration circuitry may be a look-up table that takes as its two inputs the codes output by the two template matching blocks, 116a, b. In practice, the function of the arbitration block would be to enable the black output (zero exposure) while disabling the color output (full exposure) in light of the fact that a color spot would not be visible in a black region. However, it is possible that, in certain applications, the arbitration block may be required to enable the output of a color pixel The PWPM circuitry, block 120, produces the video signals that drive the acoustooptic modulator (not shown) as described in U.S. patent application Ser. No. 08/118,858. From modeling and printing characterizations, the pulse characteristics, widths and positions, necessary to achieve the desired exposures are determined and preloaded into translating means represented by PWPM look-up tables 122 which are used to translate the pixel codes into pulse characteristics. As embodied herein, the translating means comprises four RAM look-up tables, and each code word represents an address therein. In a preferred embodiment, a pair of 256×4 ECL RAM look-up tables are used to generate a pulse attribute word for each pulse attribute sought to be controlled. More specifically, PWPM circuitry 120 sends the code to look-up table 122 and in return receives signals which are indicative of the corresponding pulse width, position and state (inverted or normal). In one embodiment, the width and position may be characterized as a pair of timing delays which specify the beginning and end of the pulse with respect to a pixel period. In addition, the embodiment illustrated in FIG. 5 further allows for two or more sets of PWPM look-up tables, wherein the look-up table to be used is selected in response to external signals which are interpreted by PWPM look-up table selection block 126. Once generated by the PWPM circuitry of block 120, the video pulse is sent to acoustooptic modulator 82 as illustrated in FIG. 1.

Figure 7A:
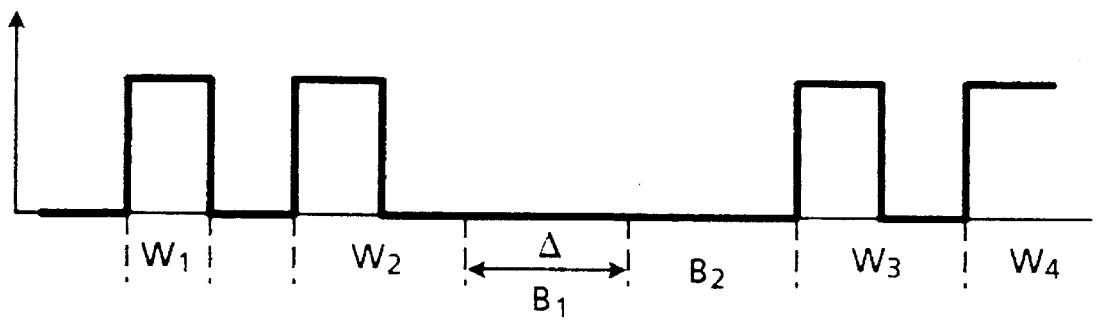
FIGS. 7A–7C are graphical illustrations of separations for electric field distributions of a 2-pixel wide black line on a white background produced using a well-known tri-level printing process.
Figure 7B:
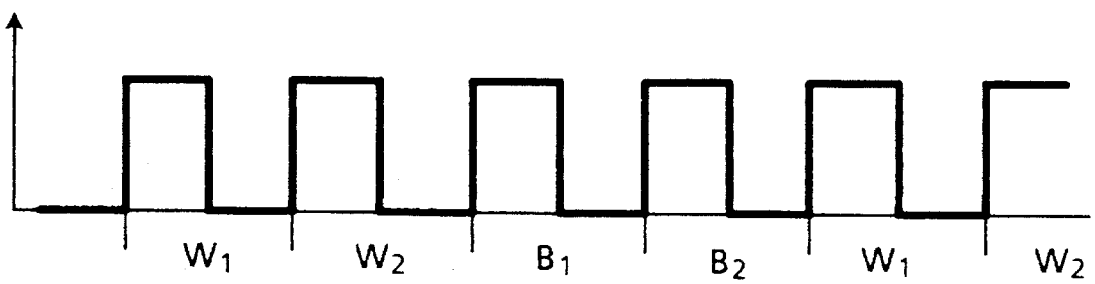
Figure 7C:
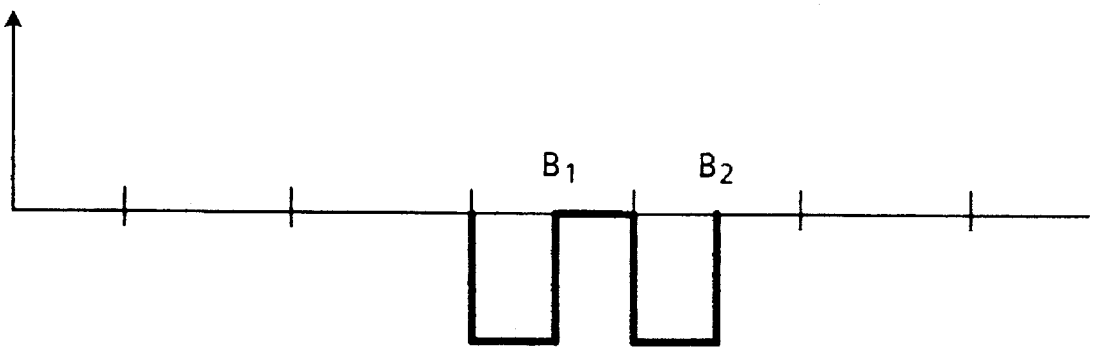

As shown by the schematic illustrations of FIGS. 7A–7C, it is possible, at least conceptually, to represent the video signal used to drive the acoustooptic modulator as a series of additive parts. For example, FIG. 7A represents the video signals or pulse train necessary to produce a two pixel wide black line which runs perpendicular to the fast scan imaging direction. The pulses are shown positioned within successive uniform pixel periods having a width Δ. Hence, for a CAD system pixel positions $B_1$ and $B_2$, represent black pixels (no exposure within the pixel period) and pixels $W_1$–$W_4$ represent white pixels (intermediate exposure, on for approximately one-half pixel period). As alluded to, the signals of FIG. 7A may be conceptually split into two additive parts; a periodic part that gets filtered or blurred by the spatial filtering characteristic of the ROS to produce a uniform exposure level, as represented by FIG. 7B, and a negative part that is blurred to form the black line by cancelling the periodic part within the region of pixel positions $B_1$ and $B_2$. Applying the same analysis method, the techniques used to form the gray or intermediate level pixel of the present invention are illustrated in the remaining figures.

Figure 8A:
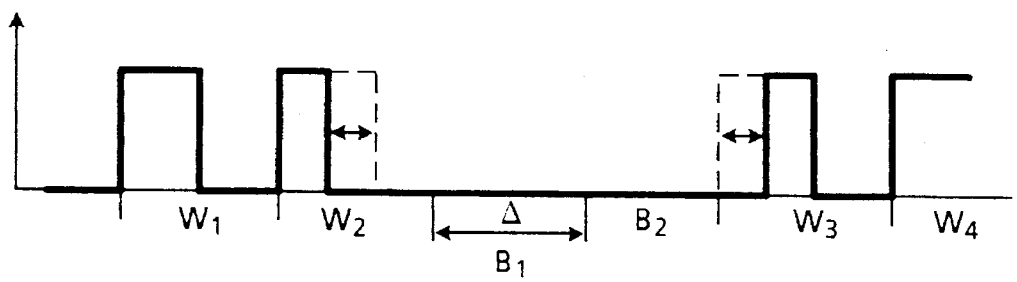
FIGS. 8A and 8B are graphical illustrations of electric field separations depicting one embodiment of the present invention for producing gray pixels.
Figure 8B:
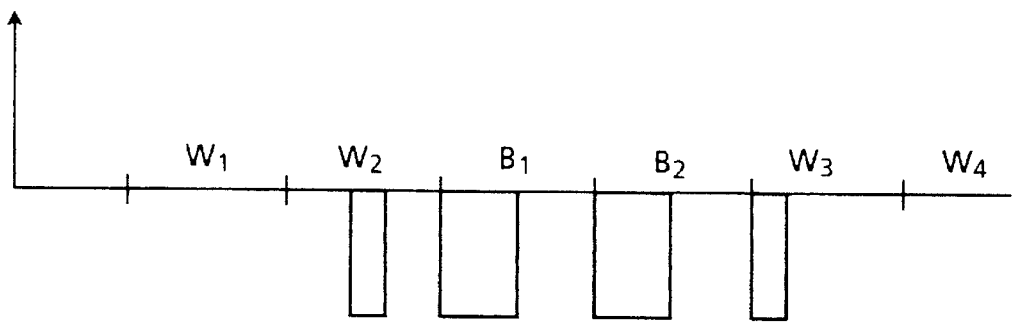

In a preferred embodiment of the present invention, the pulses used to produce the modified gray or intermediate exposure as a result of the template match are produced by "trimming" an edge of the white pixels that are adjacent to, or neighboring, the black pixels of the line. As illustrated in FIG. 8A, the trimming is accomplished by reducing the width of the pulse used to expose the adjacent white pixels, $W_2$ and $W_3$, by the amounts indicated by $T_1$ and $T_2$, respectively. Of further significance is the preference that the trimming occur on the edges of the pulses nearest the adjacent black pixel. Thus the pulse for white pixel $W_2$ is trimmed on its trailing edge, while the pulse for white pixel is trimmed on its leading edge, both resulting in gray outputs which effectively extend the the width of the line as illustrated by the corresponding separation shown in FIG. 8B. By varying the amount of the white exposure pulse that is trimmed, and relying on the previously described response of the xerographic system to intermediate exposure levels, the separation illustrated in FIG. 8B is blurred to produce a black line having a width slightly greater than two pixels wide. Thus, in response to the template match, the video pulses are generated to slightly extend the edge of, or widen, the black or charged area developed regions of the output image. Furthermore, the amount that the edges is extended is dependent upon the particular template that was matched, to enhance the edges of the regions and eliminate a jagged appearance.

Figure 9A:
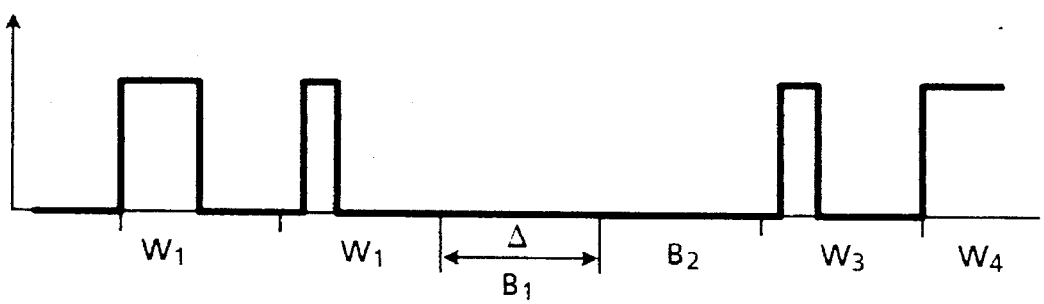
FIGS. 9A and 9B are graphical illustrations of electric field separations depicting another embodiment of the present invention which produces gray pixels.
Figure 9B:
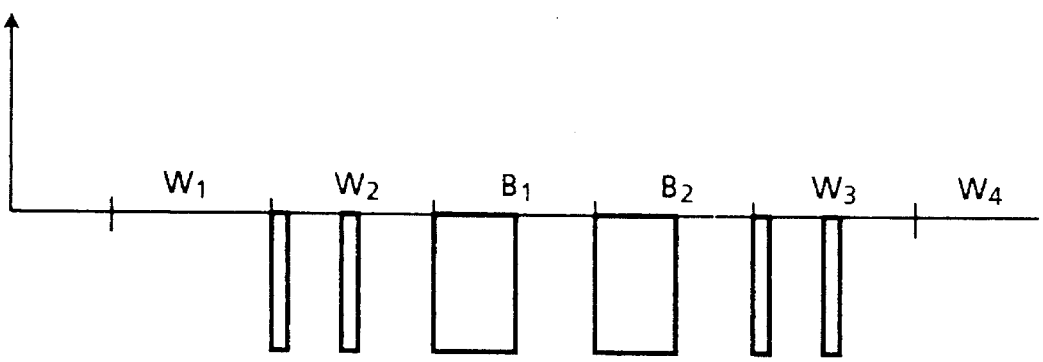

In an alternative embodiment, the pulses used to produce the modified gray or intermediate exposure as a result of the template match are again produced by modifying the adjacent white pixels. In this embodiment, however, the intermediate exposures are produced by narrowing the width of the white exposure pulses by trimming them along both their leading and trailing edges as illustrated in FIG. 9A. Once again, because of the capability of controlling the position and width of the video pulse, as described in U.S. patent application Ser. No. 08/118,858, the pulse characteristics output from the PWPM look-up tables of FIG. 5 produce intermediate exposure levels. As previously described, the intermediate exposure levels further result in widening of the regions where black marking particles are developed in the CAD system, as represented by the separation part of FIG. 9B. In the figure, the width of the narrow negative pulses within pixel positions $W_2$ and $W_3$ represent the amount trimmed from the nominal exposure used to produce white pulses in the CAD system.

In recapitulation, the present invention is an apparatus for enhancing the output along edges of charged area developed regions in a tri-level imaging system employing a pulse width and position modulated signal ROS for exposure. The invention enables the identification and selective alteration of video data used to drive the ROS so as to extend the developed regions by a selected amount and eliminate digitization artifacts present in the image to be printed. The extension of the charged area developed regions is accomplished by reducing or trimming the width of the exposure pulses in adjacent areas to enable development within a portion of those regions.

It is, therefore, apparent that there has been provided, in accordance with the present invention, a method and apparatus for enhancing charged area developed regions in a tri-level printing system. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. In a pulsed imaging, pulse width modulated printing system for creating tri-level images on a photoresponsive member, where a background pixel is produced in response to a video pulse that is on for an intermediate period, a method for enhancing a charged area developed region on the photoresponsive member, comprising the steps of:

converting a series of video data into a series of composite analog video pulses corresponding to a plurality of pixel periods, each of said pixel periods having a composite video pulse representing a charged area, discharged area, and intermediate discharged area to be formed on the surface of the photoresponsive member, said composite video pulses being applied to an acoustooptic modulator to modulate a laser beam used to expose regions of the photoresponsive member;

identifying a subset of the video data to be altered so as to improve the appearance of the charged area developed regions of the output image, including storing said video data in memory, said stored video data being selected from video data representing a neighborhood of pixels surrounding a pixel associated with the selected video data, comparing the stored video signals to a template set, wherein each template within said set has a predefined arrangement of video data, said comparing step including comparing data at template pixel positions requiring a first signal level to corresponding pixel positions in the stored video data, comparing data at template pixel positions requiring a second signal level to corresponding pixel positions in the stored video data, and only when matches for the positions first signal level and second signal level are present within the stored video signals, when the arrangement of the stored video data matches a template identifying the selected video data as a member of the subset of video data to be altered so as to improve the appearance of the output image; and altering the selected video data within the subset by modifying a video pulse corresponding to the selected video data.

2. The method of claim 1, wherein the altering step comprises the step of modifying the width of the video pulse applied to the acoustooptic modulator so as to change the level of exposure for the selected video data, thereby producing an intermediate level of exposure.

3. The method of claim 2, wherein the width of the video pulse is reduced by trimming both a first and a second edge thereof.

4. The method of claim 2, wherein the width of the video pulse is reduced by trimming a first edge thereof.

5. The method of claim 4, wherein the first edge is a leading edge of the video pulse.

6. The method of claim 4, wherein the first edge is a trailing edge of the video pulse.

7. A charged area development enhancement apparatus for a pulsed imaging, pulse width modulated printing system which creates tri-level images on a photoresponsive member, where a background pixel is produced in response to a video pulse that is on for an intermediate portion of a pixel period, including:

an acoustooptic modulator to modulate a laser beam used to expose regions of the photoresponsive member;

means for converting a stream of video data, representing a plurality of pixels, into composite analog video pulses having uniform pixel periods, each pixel period defining a composite video pulse representing a charged area, discharged area, and intermediate discharged area to be formed on the surface of said photoreceptor member, said composite video pulses being applied to the acoustooptic modulator;

means, responsive to the stream of video data, for identifying a subset of video data therein to be altered so as to improve the appearance of the charged area developed regions of the output image said identifying means comprising a predefined set of templates, each template therein representing a particular arrangement of video data, memory for storing video data corresponding to a center pixel and a plurality of neighboring pixels surrounding the center pixel, and means for comparing the stored video data to the data in the predefined set of templates to indicate when the stored video data matches one of the templates, thereby identifying the video data corresponding to the center pixel as a member of the subset of video data to be altered so as to improve the appearance of the output image, said comparing means including first matching means for successively comparing template pixel positions requiring a first video data level (black) to corresponding pixel positions in the stored video data and indicating a match with a first matching signal, second matching means for successively comparing template pixel positions requiring a second signal level (white) to corresponding pixel positions in the stored video signals and indicating a match with a second matching signal, and means, responsive to the presence of the first and second matching signals, for signaling that the video data representing the center pixel is to be altered; and means for altering the video data representing a selected pixel within the subset by modifying the video pulse corresponding to the selected pixel.

8. The apparatus of claim 7, wherein said memory includes a plurality of scanline buffers.

9. The apparatus of claim 7, wherein said comparing means includes a plurality of scanline buffers.

10. The apparatus of claim 9, wherein said template comprises a matrix of data storage locations, each data storage location having a predefined data level for comparison against a corresponding video data level stored in one of said scanline buffers.

11. The apparatus of claim 7, wherein said altering means includes means for modifying the width of the video pulse applied to the acoustooptic modulator so as to change the level of exposure for the selected pixel, thereby producing an intermediate level of exposure.

12. The apparatus of claim 11, wherein said width modifying means trims a first edge of the video pulse.

13. The apparatus of claim 12, wherein the first edge is a leading edge of the video pulse.

14. The apparatus of claim 12, wherein the first edge is a trailing edge of the video pulse.

15. The apparatus of claim 11, wherein said width modifying means trims both a leading and a trailing edge of the video pulse.

16. The apparatus of claim 11, wherein:

said identifying means produces a code for each signal within the subset, said code representing the manner in which the signal is to be altered; and said modifying means includes translating means to translate the code into a video pulse characteristic.

17. The apparatus of claim 16, wherein the video pulse characteristic is a member of the set consisting of:

video pulse width;

video pulse position; and video pulse state.

18. The apparatus of claim 16, wherein said translating means comprises a look-up table.

* * * * *